(12) United States Patent
Chin et al.

(10) Patent No.: US 6,927,760 B2
(45) Date of Patent: Aug. 9, 2005

(54) WIRELESS KEYBOARD WITH IMPROVING RADIATION TRANSMISSION

(75) Inventors: Kuo-Chiang Chin, Taoyuan (TW); Chia-Hung Liu, Taoyuan (TW); Ming-Wei Hung, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 247 days.

(21) Appl. No.: 10/265,010

(22) Filed: Oct. 3, 2002

(65) Prior Publication Data

US 2004/0066375 A1 Apr. 8, 2004

(51) Int. Cl.⁷ .............................................. G09G 5/00
(52) U.S. Cl. ........................ 345/168; 345/169; 341/22
(58) Field of Search ............................... 345/168, 169, 345/173, 156, 157, 158; 341/22, 23; 361/680, 681

(56) References Cited

U.S. PATENT DOCUMENTS

| | | | | |
|---|---|---|---|---|
| 5,440,502 A | * | 8/1995 | Register | ................... 361/681 |
| 5,781,405 A | | 7/1998 | Vossler | |
| 5,978,213 A | | 11/1999 | Vossler | |
| 5,978,214 A | | 11/1999 | Vossler | |
| 6,104,606 A | | 8/2000 | Vossler | |
| 6,342,858 B1 | * | 1/2002 | Dakeya et al. | ............... 343/702 |
| 6,405,061 B1 | * | 6/2002 | Bae | ........................... 455/566 |
| 6,473,071 B2 | * | 10/2002 | Liu | ............................. 345/168 |
| 6,480,372 B1 | * | 11/2002 | Vong et al. | ................. 361/680 |
| 2001/0033267 A1 | * | 10/2001 | Kim et al. | ................... 345/156 |
| 2004/0001047 A1 | * | 1/2004 | Wang | ......................... 345/168 |

* cited by examiner

Primary Examiner—Xiao Wu
(74) Attorney, Agent, or Firm—Ladas & Parry LLP

(57) ABSTRACT

The invention relates to a wireless keyboard capable of operating with a radiation-based signal receiver of a portable computing apparatus. The wireless keyboard includes a radiation-based signal transmitter functions converting a corresponding key signal into a radiation beam and emitting the radiation beam. The radiation beam has a covered zone. The wireless keyboard also includes a user-adjustable engaging device having a first end engaging with the housing and a second end where the radiation-based signal transmitter is fixed. The radiation-based signal transmitter is capable of approaching the radiation-based signal receiver by adjusting the engaging device. Thereby, the radiation-based signal receiver is located in the covered zone of the radiation beam when the wireless keyboard operates with the radiation-based signal receiver.

24 Claims, 9 Drawing Sheets

WIRELESS KEYBOARD WITH IMPROVING RADIATION TRANSMISSION

FIELD OF THE INVENTION

Figure 1A:
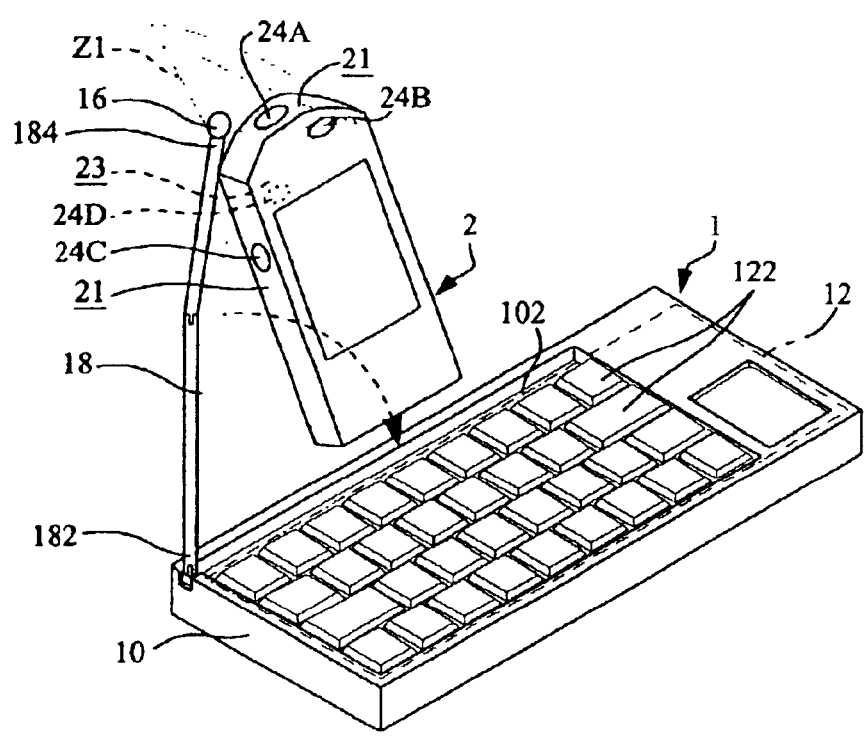

This present invention relates to a wireless keyboard capable of operating with a radiation-based signal receiver of a portable computing apparatus, and more particularly to a wireless keyboard with improving radiation transmission to the radiation-based signal receiver of the portable computing apparatus.

BACKGROUND OF THE INVENTION

In response to consumer demand and technological advances, increasingly smaller and specialized portable computing apparatuses have been designed, e.g., personal digital assistants (PDA), mobile phones, pocket computers and the like. For example, users have embraced the smaller PDAs and the like which, while designed to provide a lesser number of capabilities than personal computers (PCs), provide the most essential and used computer functions in a design which may be carried in a pocket. The specialized functions may include scheduling functions, an address database, spreadsheet applications and simple word processing or note producing applications.

The above portable computing apparatuses, which are typically referred to as digital information apparatuses, computer information appliances, etc. Many of these portable computing apparatuses combine PDA-like functions with more powerful applications, like Internet connectivity and e-mail capability. In such case, it would be desirable to have both a touch screen functionality provided by a PDA for simple tasks like retrieving a phone number or a calendar, and a convenient keyboard arrangement for other functions such as composing long e-mails, documents or the like. To the end, it would be useful to be able to quickly stow and retrieve the associated keyboard in a convenient manner.

On consideration of convenience, wireless keyboard are popularly used with portable computing apparatuses. Specifically, infrared wireless keyboards for use with portable computing apparatuses are known. An infrared wireless keyboard simply uses an infrared transmitter in the keyboard and an infrared receiver in a portable computing apparatuses to establish an link between the keyboard and the portable computing apparatus. The infrared wireless keyboard does not, of course, need a physical wire connection between the keyboard and the personal computer so that there is no wire clutter.

The infrared wireless keyboard, however, has numerous drawbacks. Specifically, the infrared wireless keyboard requires no obstacle in a path between the infrared transmitter in the keyboard and the infrared receiver in the portable computing apparatus. Whenever a portable computing apparatuses has an infrared receiver set on "odd" situation thereof, possibility of establishing transmission path between an infrared transmitter of an infrared wireless keyboard and the infrared receiver of the portable computing apparatus becomes a criterion to determine whether the wireless keyboard is available or not.

Pocketop Computer Corp. has developed an attachment for an infrared wireless keyboard used with a portable computing apparatus with an infrared receivers set on or near top side thereof. The attachment includes a support and a reflective board engaged to the support. The portable computing apparatus can be positioned substantially erected by leaning itself against the support. In such case, the reflective board can reflect infrared beam emitted from the infrared transmitter to the infrared receiver. However, it is obvious that the solution, provided by Pocketop Computer Corp., is only applied to portable computing apparatuses with infrared receivers set on or near top sides thereof. That is the wireless keyboard of the prior art is not applicable for a portable computing apparatus which has an infrared receiver set on "odd" situations thereof, e.g., waist sides or rear sides.

Gateway 2000, Inc. has utilized various improved configurations for adjusting emitting or receiving direction of an infrared emitted from or to an infrared transceiver set on an electronic apparatus. Details regarding the aforesaid improved configurations have been disclosed in the U.S. Pat. Nos. 6,104,606, 5,978,214, 5,978,213, and 5,781,405. However, it is obvious that the solutions, provided by Gateway 2000, Inc., can not be applied to compact and portable computing apparatuses equipped with infrared receivers. Even if an infrared transmitter of a wireless keyboard according to the aforesaid prior arts is capable of adjusting emitting direction of an infrared emitted therefrom, the wireless keyboard is not applicable for a portable computing apparatus which has an infrared receiver set on or near top sides thereof.

Therefore, no obstacle in the path and a shorter distance between the transmitter and the receiver constrain the flexibility that user would use a wireless keyboard because an artificial limit is placed on the location and the distance do exist between the infrared wireless keyboard and the portable computing apparatus. Moreover, the distance between the infrared wireless keyboard and the portable computing apparatus must not be too great so that the infrared receiver in the portable computing apparatus cannot detect the infrared beam from the infrared transmitter of the infrared wireless keyboard.

In addition, the infrared wireless keyboard has large power consumption requirements because of the infrared transmitter. The infrared wireless keyboard typically operates on a six-volt power source that is commonly derived from four 1.5-volt batteries. Moreover, the increased power consumption reduces overall battery life so that the batteries must be replaced more often.

SUMMARY OF THE INVENTION

Accordingly, an objective of the invention is to provide a universal wireless keyboard used with a portable computing apparatus with a radiation-based signal receiver, such as an infrared receivers, set on any situation, even an "odd" situation.

Another objective of the invention is to provide a wireless keyboard, with a radiation-based signal transmitter such as an infrared transmitter, capable of operating with a radiation-based signal receiver, such as an infrared receiver, of a portable computing apparatus. Moreover, in particular, no obstacle and a shorter distance is provided between the radiation-based signal transmitter of the wireless keyboard and the radiation-based signal receiver of the portable computing apparatus.

Another objective of the invention is to provide a wireless keyboard with a radiation-based transmitter which can employ device of less power consumption.

A wireless keyboard, according to a first preferred embodiment of the invention, is capable of operating with a radiation-based signal receiver of a portable computing apparatus. The wireless keyboard includes a housing, a user input device mounted in the housing, a processor, a radiation-based signal transmitter, and a user-adjustable engaging device. The user input device includes a plurality of user-operable keys. The processor functions generating a corresponding key signal responsive to key-in of one of the keys. The radiation-based signal transmitter functions converting the corresponding key signal into a radiation beam and emitting the radiation beam. The radiation beam has a covered zone. The user-adjustable engaging device has a first end engaging with the housing and a second end where the radiation-based signal transmitter is fixed. The radiation-based signal transmitter is capable of approaching the radiation-based signal receiver by adjusting the engaging device. Thereby, the radiation-based signal receiver is located in the covered zone of the radiation beam when the keyboard operates with the radiation-based signal receiver of the portable computing apparatus.

A wireless keyboard, according to a second preferred embodiment of the invention, is capable of operating with a radiation-based signal receiver of a portable computing apparatus. The wireless keyboard includes a housing, a user input device mounted in the housing, a processor, a radiation-based signal transmitter, and an engaging device. The housing includes a base and a top cover pivotally engaged with the base. The user input device is mounted in the base, and includes a plurality of user-operable keys. The processor functions generating a corresponding key signal responsive to key-in of one of the keys. The radiation-based signal transmitter functions converting the corresponding key signal into a radiation beam and emitting the radiation beam. The radiation beam has a covered zone. The engaging device has a first end engaging with the top cover and a second end where the radiation-based signal transmitter is fixed. The radiation-based signal transmitter is capable of approaching the radiation-based signal receiver by making the top cover in an opened condition and adjusting the engaging device. Thereby, the radiation-based signal receiver is located in the covered zone of the radiation beam when the wireless keyboard operates with the radiation-based signal receiver of the portable computing apparatus.

A wireless keyboard, according to a third preferred embodiment of the invention, is capable of operating with a radiation-based signal receiver of a portable computing apparatus. The wireless keyboard includes a housing, a user input device mounted in the housing, a processor, a radiation-based signal transmitter, and an engaging device. The housing includes a base and a top cover. The top cover is pivotally engaged with the base, and has an opening. The user input device is mounted in the base, and includes a plurality of user-operable keys. The processor functions generating a corresponding key signal responsive to key-in of one of the keys. The radiation-based signal transmitter functions converting the corresponding key signal into a radiation beam and emitting the radiation beam. The radiation beam has a covered zone. The engaging device has a first end engaging with the top cover and a second end where the radiation-based signal transmitter is fixed. The engaging device is movably seated within the top cover and capable of moving out of the top cover through the opening. The radiation-based signal transmitter is capable of approaching the radiation-based signal receiver by making the top cover in an opened condition to expose the use the user-operable keys. Thereby, the radiation-based signal receiver is located in the covered zone of the radiation beam emitted through the opening when the wireless keyboard operates with the radiation-based signal receiver of the portable computing apparatus.

The advantage and spirit of the invention may be understood by the following recitations together with the appended drawings.

BRIEF DESCRIPTION OF THE APPENDED DRAWINGS

FIG. 1A is an outside perspective view of a wireless keyboard 1 according to the first preferred embodiment of the invention showing that the wireless keyboard 1 is capable of operating with a radiation-based signal receiver 24A set on the top side of a portable computing apparatus 2.

Figure 1B:
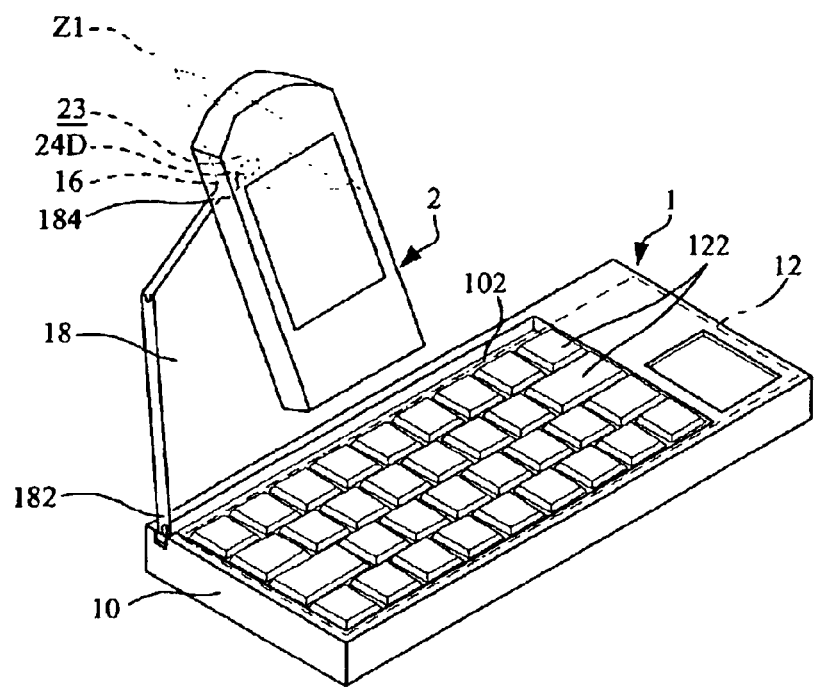

FIG. 1B is another outside perspective view of a wireless keyboard 1 according to the first preferred embodiment of the invention showing that the wireless keyboard 1 is capable of operating with a radiation-based signal receiver 24D set on the rear side of the portable computing apparatus 2.

Figure 2:
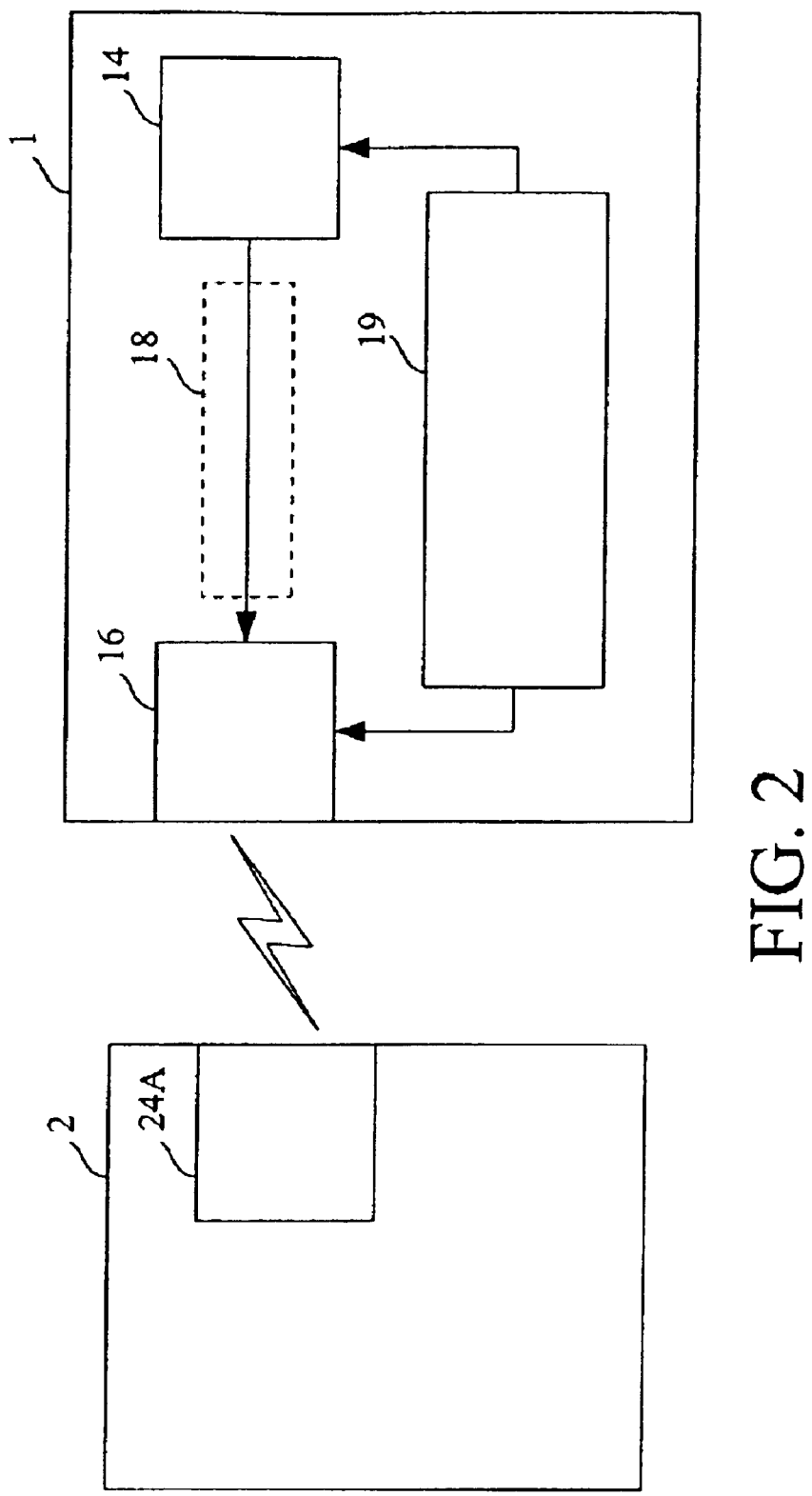

FIG. 2 shows schematically some essential devices of the wireless keyboard 1 in manner of illustrating function blocks.

Figure 3A:
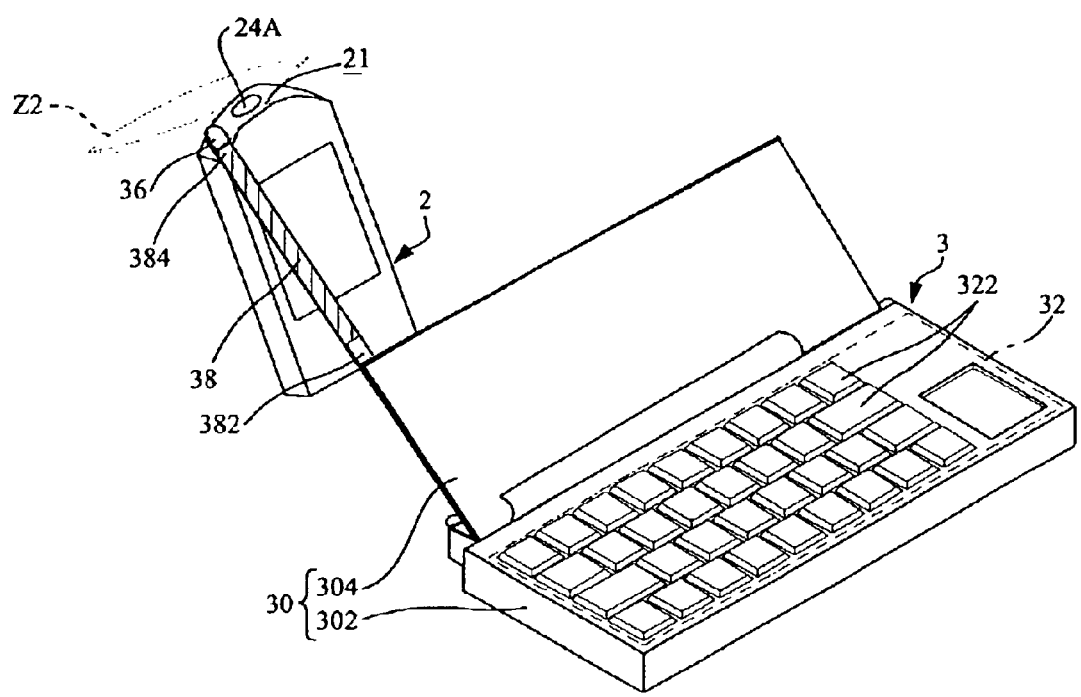

FIG. 3A is an outside perspective view of a wireless keyboard 3 according to the second preferred embodiment of the invention showing that the wireless keyboard 3 is also capable of operating with the radiation-based signal receiver 24A set on the top side of the portable computing apparatus 2 in FIG. 1.

Figure 3B:
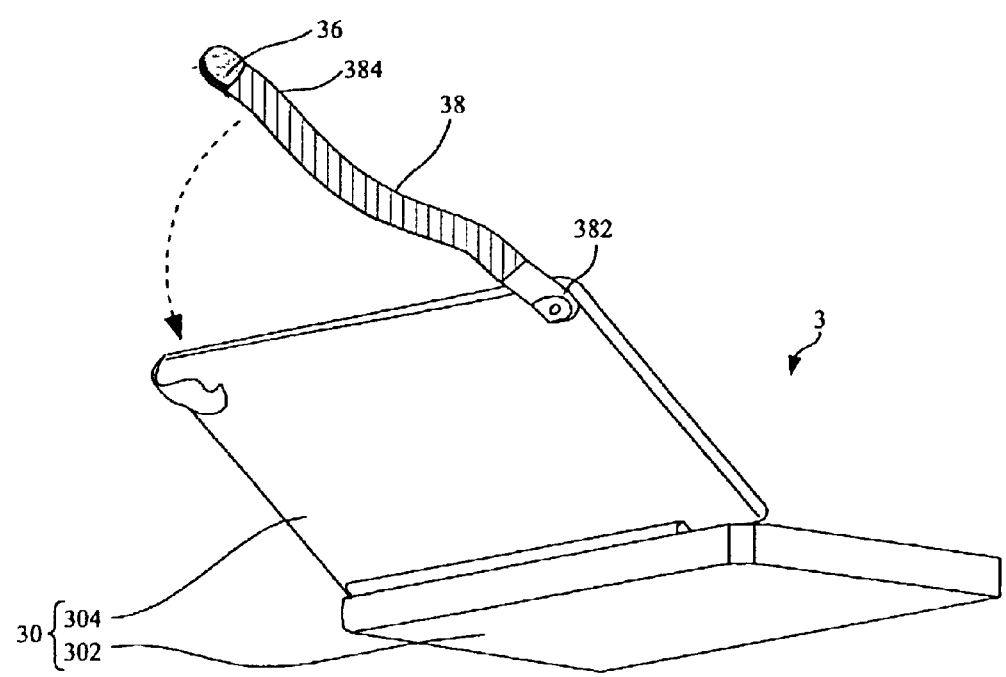

FIG. 3B is another outside perspective view of the wireless keyboard 3 according to the second preferred embodiment of the invention. The engaging device 38, shown in FIG. 3B, is pivotally and rotatablly engaged with the top cover 304 via the first end 382.

Figure 4A:
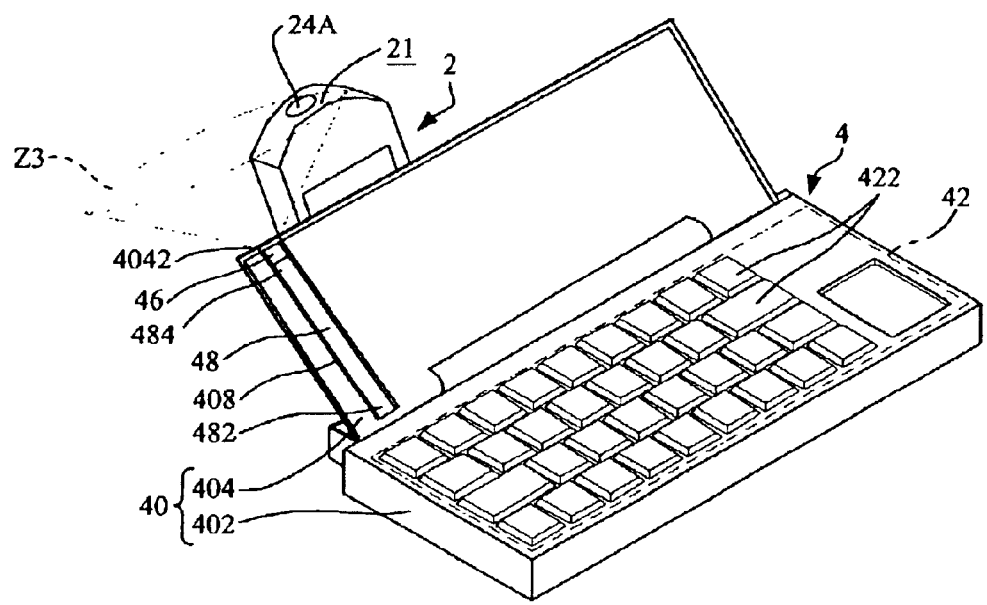

FIG. 4A is an outside perspective view of a wireless keyboard 4 according to the third preferred embodiment of the invention showing that the wireless keyboard 4 is capable of operating with a radiation-based signal receiver 24A of the portable computing apparatus 2 in FIG. 1.

Figure 4B:
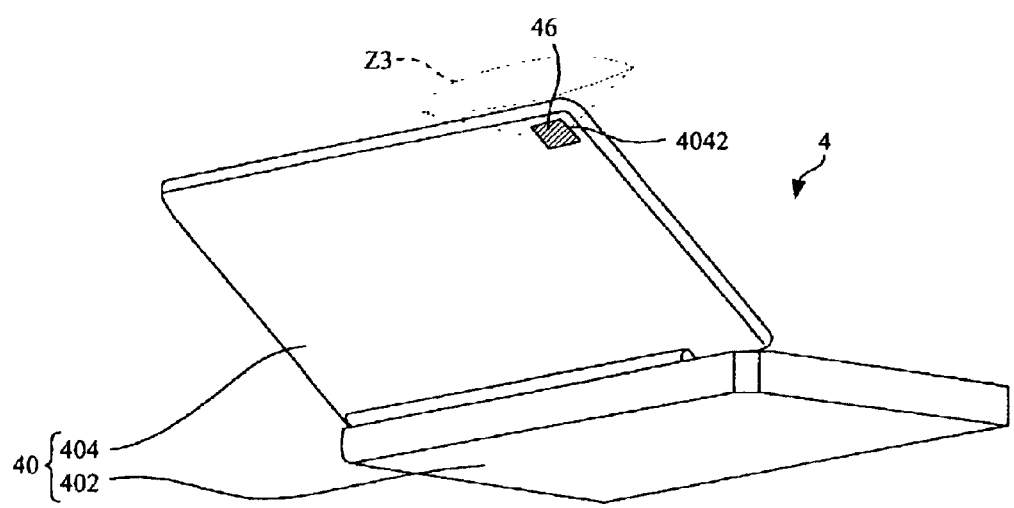

FIG. 4B is another outside perspective view of the wireless keyboard 4 according to the third preferred embodiment of the invention. The radiation beam emitted from the radiation-based signal transmitter 46 within the top cover 404 engaging device 48 can pass through the opening 4042.

Figure 4C:
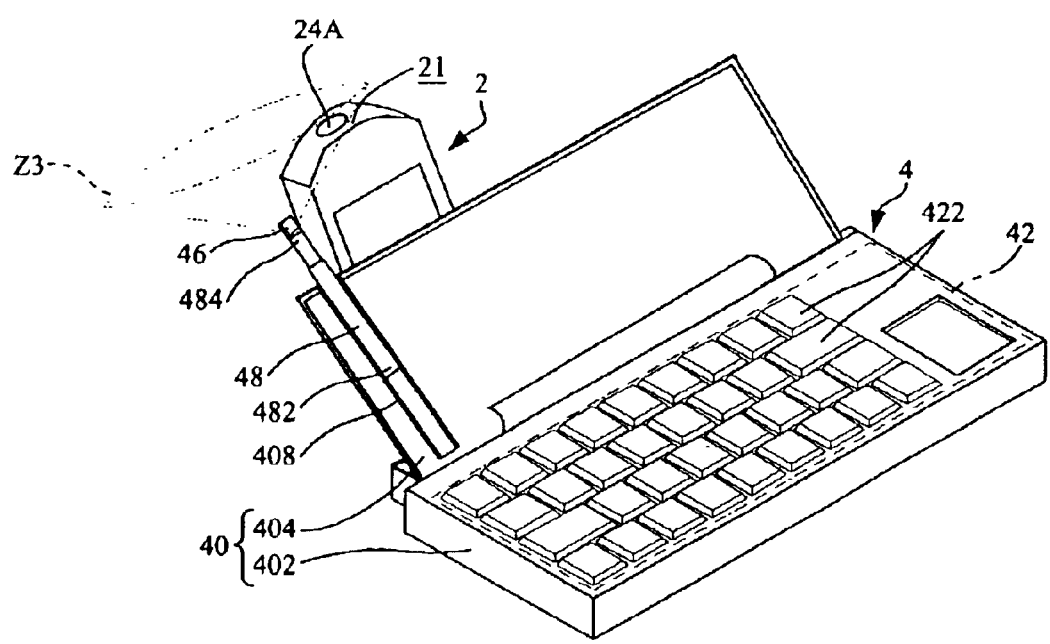

FIG. 4C is another outside perspective view of the wireless keyboard 4 according to the third preferred embodiment of the invention. The engaging device 48, shown in FIG. 4B, is designed as being telescopic and can move out of the top cover 404.

Figure 4D:
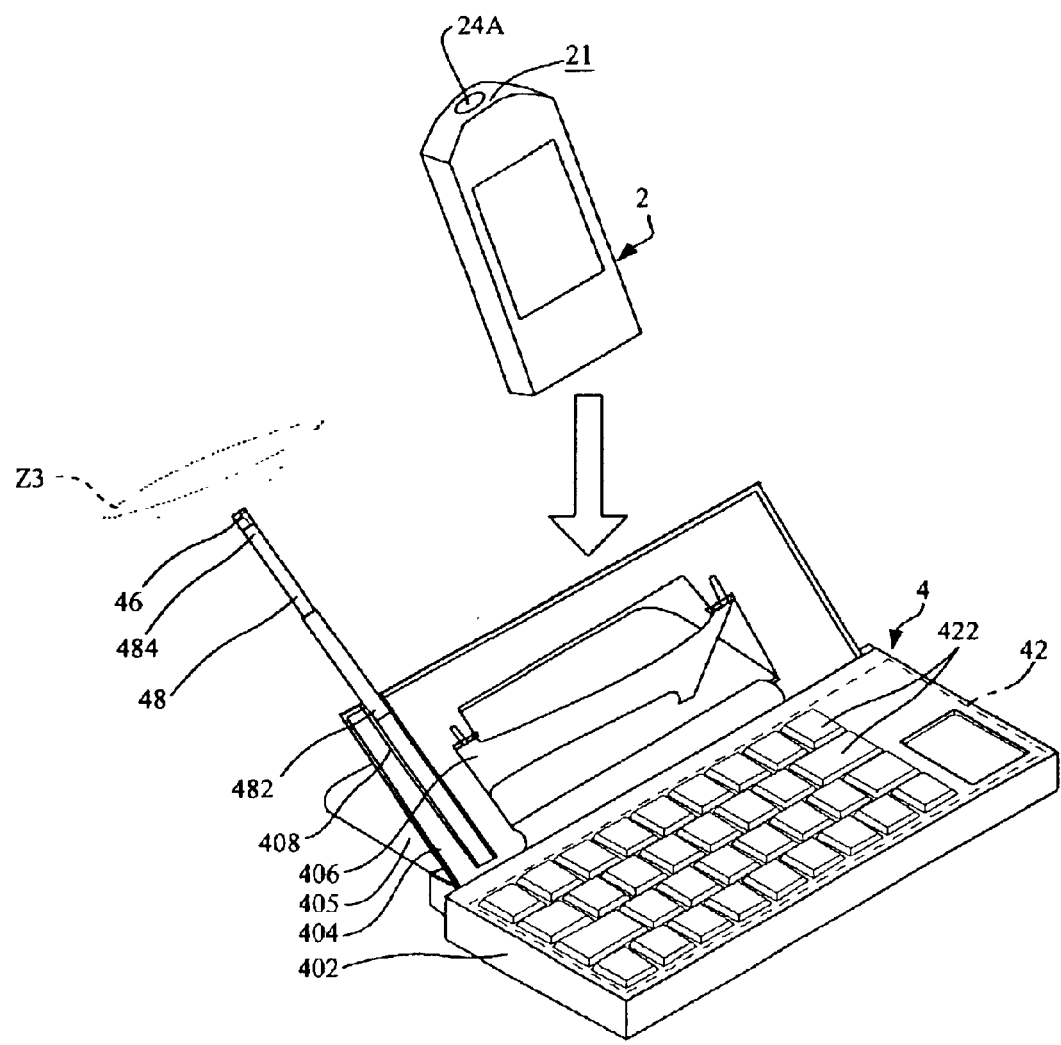

FIG. 4D is an outside perspective view of the wireless keyboard 4 according to a modification of the third preferred embodiment of the invention showing the wireless keyboard 4 can provide a supporting mechanism for supporting the portable computing apparatus 2.

DETAILED DESCRIPTION OF THE INVENTION

Referring to FIG. 1A, FIG. 1B and FIG. 2, the first preferred embodiment of the invention is described in detail. FIG. 1A is an outside perspective view of a wireless keyboard 1 according to the first preferred embodiment of the invention. As shown in FIG. 1A, a portable computing apparatus 2 has a top side 21, a waist side 22 and a rear side 23. The portable computing apparatus 2 has a radiation-based signal receiver which the wireless keyboard 1 is capable of operating with. In particular, the radiation-based signal receiver may be set on any situation of the portable computing apparatus 2. For example, the radiation-based signal receiver, indicated by reference numeral 24A, is set on the top side 21 of the portable computing apparatus 2. The radiation-based signal receiver, indicated by reference numeral 24B, is set near the top side 21 of the portable computing apparatus 2. The radiation-based signal receiver, indicated by reference numeral 24C, is set on the waist side 22 of the portable computing apparatus 2. The radiation-based signal receiver, indicated by reference numeral 24D, is set on the rear side 23 of the portable computing apparatus 2. Usually, the portable computing apparatus 2 has only one radiation-based signal receiver. For the purpose of description, the following description will describe how does the wireless keyboard 1 operate with the radiation-based signal receiver 24A of the portable computing apparatus 2.

FIG. 2 shows schematically some essential devices of the wireless keyboard 1 in manner of illustrating function blocks. In FIG. 2, the transmission of signal between the wireless keyboard 1 and the portable computing apparatus 2 is schematically illustrated.

As shown in FIG. 1A and FIG. 2, the wireless keyboard 1 includes a housing 10, a user input device 12, a processor 14, a radiation-based signal transmitter 16 and a user-adjustable engaging device 18.

The user input device 12 is mounted in the housing 10. The user input device 12 includes a plurality of user-operable keys 122, as shown in FIG. 1A.

The processor 14 can generate a corresponding key signal in responsive to key-in of one of the keys 122.

The radiation-based signal transmitter 16 functions converting the corresponding key signal from the processor 14 into a radiation beam, and then emitting the radiation beam. In this embodiment, the radiation beam can be an infrared beam, the radiation-based signal transmitter 16 can be an infrared transmitter, and the radiation-based signal receiver 24A can be an infrared receiver.

It is well-known that the radiation beam has a covered zone Z1, and that the radiation-based signal receiver 24A of the portable computing apparatus 2 must be located within the covered zone Z1 of the radiation beam during the operation of the wireless keyboard 1 with the radiation-based signal receiver 24A of the portable computing apparatus 2.

The user-adjustable engaging device 18 has a first end 182 engaging with the housing 10 and a second end 184 where the radiation-based signal transmitter 16 is fixed. When the wireless keyboard 1 operates with the radiation-based signal receiver 24A, the radiation-based signal transmitter 16 approaches the radiation-based signal receiver 24A by adjusting the engaging device 18 such that the radiation-based signal transmitter 16 is located in the covered zone Z1 of the radiation beam.

It will be well-known to one skilled in the art that the engaging device 18 can be designed as being rotatable, telescopic, flexible or folding so that the radiation-based signal transmitter 16 is capable of approaching the radiation-based signal receiver 24A by adjusting the engaging device 18. Thereby, the radiation-based signal receiver 24A is located in the covered zone Z1 of the radiation beam when the wireless keyboard 1 operates with the radiation-based signal receiver 24A.

In another embodiment, the housing 10 further has an accommodating room 102, as shown in FIG. 1A. In such case, the engaging device 18 accompanying with the radiation-based signal transmitter 16 can be accommodated into the accommodating room 102.

Due to the user-adjustable engaging device 18, the wireless keyboard 1 of the invention can be universally used with the portable computing apparatus 2 whose radiation-based signal receiver set on any situation, even an "odd" situation. Taking the radiation-based signal receiver 24A set on the top side 21 of the portable computing apparatus 2 as an example, if the wireless keyboard 1 and the portable computing apparatus 2, set upright, are substantially positioned in co-planar, the radiation-based signal transmitter 16 can be lifted higher than the top side 21 of the portable computing apparatus 2 by adjusting the engaging device 18. Thereby, the radiation-based signal receiver 24A is located in the covered zone Z1 of the radiation beam when the wireless keyboard 1 operates with the radiation-based signal receiver 24A.

Also taking the radiation-based signal receiver 24D of FIG. 1A as another example, as shown in FIG. 1B, the radiation-based signal receiver 24D is set on the rear side 23 of the portable computing apparatus 2. The wireless keyboard 1 in FIG. 1B is the same as that in FIG. 1A. The portable computing apparatus 2 in FIG. 1B is the same as that in FIG. 1A, but only the radiation-based receiver 24D set on the rear side of the portable computing apparatus 2 is shown. As shown in FIG. 1B, the position of the radiation-based signal transmitter 16 can be adjusted by adjusting the engaging device 18. Therefore, when the wireless keyboard 1 operates with the radiation-based signal receiver 24D, the radiation-based signal transmitter 16 can also approach the radiation-based signal receiver 24D, and thereby, the radiation-based signal receiver 24D is located in the covered zone Z1 of the radiation beam.

In this embodiment, the radiation-based signal transmitter 16 is electrically connected to the processor 14 through the engaging device 18, as shown in FIG. 1A.

As shown in FIG. 2, the wireless keyboard 1 further includes a battery 19, such as a rechargeable battery or a dry battery, for supplying power of the processor 14 and the radiation-based signal transmitter 16.

Referring to FIG. 3A and FIG. 3B, the second preferred embodiment of the invention is described in detail. FIG. 3A is an outside perspective view of a wireless keyboard 3 according to the second preferred embodiment of the invention. The wireless keyboard 3 is capable of operating with the radiation-based signal receiver of the portable computing apparatus 2 shown in FIG. 1A. For the purpose of description, the following description will describe how the wireless keyboard 3 operates with the radiation-based signal receiver 24A of the portable computing apparatus 2.

As shown in FIG. 3A, the wireless keyboard 3 includes a housing 30, a user input device 32, a processor 34, a radiation-based signal transmitter 36 and an engaging device 38. The housing 30 have a base 302 and a top cover 304 pivotally engaged with the base 302.

The user input device 32 is mounted in the base 302. The user input device 32 includes a plurality of user-operable keys 322, as shown in FIG. 3A.

The processor 34 can generate a corresponding key signal in response to key-in of one of the keys 322.

The radiation-based signal transmitter 36 functions converting the corresponding key signal from the processor 34 into a radiation beam, and then emitting the radiation beam. In this embodiment, the radiation beam can be an infrared beam, the radiation-based signal transmitter 36 can be an infrared transmitter, and the radiation-based signal receiver 24A can be an infrared receiver.

It is well-known that the radiation beam has a covered zone Z2, and that the radiation-based signal receiver 24A of the portable computing apparatus 2 must be located within the covered zone Z2 of the radiation beam during the operation of the wireless keyboard 3 with the radiation-based signal receiver 24A of the portable computing apparatus 2.

As shown in FIG. 3A and FIG. 3B, the engaging device 38 has a first end 382 engaging with the top cover 302 and a second end 384 where the radiation-based signal transmitter 36 is fixed.

The radiation-based signal transmitter 36 is capable of approaching the radiation-based signal receiver 24A by making the top cover 302 in an opened condition to expose the user-operable keys 322 by adjusting the engaging device 38. Thereby, the radiation-based signal receiver 24A is located in the covered zone Z2 of the radiation beam when the wireless keyboard 3 operates with the radiation-based signal receiver 24A. As shown in FIG. 3B, the engaging device 38 is pivotally and rotatablly engaged with the top cover 304 via the first end 382, and the engaging device 38 is designed as being flexible. In such case, the wireless keyboard 3 is applicable for the portable computing apparatus 2 equipped with an radiation-based signal receiver set on any situation side thereof.

In this embodiment, the radiation-based signal transmitter 36 is electrically connected to the processor 34 through the engaging device 38 and the top cover 304.

In another preferred embodiment, the wireless keyboard 3 further includes a battery (not shown in FIG. 3A and FIG. 3B), such as a rechargeable battery or a dry battery, for supplying power of the processor 34 and the radiation-based signal transmitter 36.

Referring to FIG. 4A through FIG. 4D, the third preferred embodiment of the invention is described in detail. FIG. 4A is an outside perspective view of a wireless keyboard 4 according to the third preferred embodiment of the invention. The wireless keyboard 3 is capable of operating with the radiation-based signal receiver of the portable computing apparatus 2 shown in FIG. 1A. For the purpose of description, the following description will describe how the wireless keyboard 4 operates with the radiation-based signal receiver 24A of the portable computing apparatus 2.

As shown in FIG. 4A, the wireless keyboard 4 includes a housing 40, a user input device 42, a processor 44, a radiation-based signal transmitter 46 and an engaging device 48. The housing 40 have a base 402 and a top cover 404 pivotally engaged with the base 402. As shown in FIG. 4B, the top cover 404 also has an opening 4042.

The user input device 42 is mounted in the base 402. The user input device 42 includes a plurality of user-operable keys 422, as shown in FIG. 4A.

The processor 44 can generate a corresponding key signal in response to key-in of one of the keys 422.

The radiation-based signal transmitter 46 functions converting the corresponding key signal from the processor 44 into a radiation beam, and then emitting the radiation beam. In this embodiment, the radiation beam can be an infrared beam, the radiation-based signal transmitter 46 can be an infrared transmitter, and the radiation-based signal receiver 24A can be an infrared receiver.

It is well-known that the radiation beam has a covered zone Z3, and that the radiation-based signal receiver 24A of the portable computing apparatus 2 must be located within the covered zone Z3 of the radiation beam during the operation of the wireless keyboard 4 with the radiation-based signal receiver 24A of the portable computing apparatus 2.

As shown in FIG. 4A, the engaging device 48 has a first end 482 engaging with the top cover 404 and a second end 484 where the radiation-based signal transmitter 46 is fixed. The engaging device 48 is normally seated within the top cover 404 and capable of moving out of the top cover 404. That is the engaging device 48 is designed as being telescopic, and a groove 408 is provided on the inner side of the top cover 404. In this embodiment, the engaging device 48 accompanying with the radiation-based signal transmitter 46 can be accommodated within the groove 408. In such case, the radiation beam emitted from the radiation-based signal transmitter 46 can pass through the opening 4042, as shown in FIG. 4B. The engaging device 48 accompanying with the radiation-based signal transmitter 46 can also move out of the top cover 404.

As shown in FIG. 4A, the radiation-based signal transmitter 46 is capable of approaching the radiation-based signal receiver 24A by making the top cover 402 in an opened condition to expose the user-operable keys 422. Thereby, the radiation-based signal receiver 24A is located in the covered zone Z3 of the radiation beam when the wireless keyboard 4 operates with the radiation-based signal receiver 24A. As shown in FIG. 4C, the radiation-based signal transmitter 46 is capable of approaching the radiation-based signal receiver 24A further more also by adjusting the engaging device 48 other than by making the top cover 404 in the opened condition, i.e., the engaging device 48 moves out of the top cover 404 through the opening 4042.

In addition, the engaging device 48 can be designed as being rotatablly engaged with the top cover 404 via the first end 382, or being flexible. In such case, the wireless keyboard 4 is applicable for the portable computing apparatus 2 equipped with an radiation-based signal receiver set on any situation side thereof.

In a modification of the third preferred embodiment, as shown in FIG. 4D, the housing 40 further includes a first door 405 and a second door 406 respectively engaging with the top cover 404. Also shown in FIG. 4D, a supporting mechanism is formed by making the top cover 404, the first door 405 and the second door 406 in an assembly condition. It is convenient that the portable computing apparatus 2 is capable of being supported by the supporting mechanism. The supporting mechanism also supports the wireless keyboard 4 for preventing the wireless keyboard 4 from toppling down when the top cover 404 is in the opened condition.

In this embodiment, the radiation-based signal transmitter 46 is electrically connected to the processor 44 through the engaging device 48 and the top cover 404.

In another preferred embodiment, the wireless keyboard 4 further includes a battery (not shown in FIG. 4A through FIG. 4D), such as a rechargeable battery or a dry battery, for supplying power of the processor 44 and the radiation-based signal transmitter 46.

It will be apparent to those skilled in the art, after reading this detailed description, that the wireless keyboard of the invention can provide clear line-of-sight and reduced distance between the radiation-based signal transmitter of the wireless keyboard and the radiation-based signal receiver of the portable computing apparatus. Due to the reduction of transmitted distance between the radiation-based signal transmitter and the radiation-based signal receiver, the radiation-based transmitter of the wireless keyboard can employ devices of less power consumption in this invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A keyboard capable of operating with a radiation-based signal receiver of a portable computing apparatus, the radiation-based signal receiver being set on or near a top side of the portable computing apparatus, said keyboard comprising:

a housing having an accommodating room;

a user input device mounted in the housing, the user input device comprising a plurality of user-operable keys;

a processor for generating a corresponding key signal responsive to key-in of one of the keys;

a radiation-based signal transmitter for converting the corresponding key signal into a radiation beam and emitting the radiation beam, the radiation beam having a covered zone;

a user-adjustable engaging device having a first end engaging with the housing and a second end where the radiation-based signal transmitter is fixed, the engaging device accompanying with the radiation-based signal transmitter being capable of being accommodated into the accommodating room; and wherein when the keyboard and the portable computing apparatus, set upright, are substantially positioned in co-planar, the radiation-based signal transmitter is capable of being lifted higher than the top side of the portable computing apparatus by adjusting the engaging device, and when the keyboard operates with the radiation-based signal receiver, the radiation-based signal transmitter approaches the radiation-based signal receiver by adjusting the engaging device such that the radiation-based signal receiver is located in the covered zone of the radiation beam.

2. The keyboard of claim 1, wherein the radiation-based signal transmitter is electrically connected to the processor through the engaging device.

3. The keyboard of claim 2, further comprising a battery for supplying power for operation of the processor and the radiation-based signal transmitter.

4. The keyboard of claim 3, wherein the radiation beam is an infrared beam, the radiation-based signal transmitter is an infrared transmitter, and the radiation-based signal receiver is an infrared receiver.

5. A keyboard capable of operating with a radiation-based signal receiver of a portable computing apparatus, the radiation-based signal receiver being set on or near a top side of the portable computing apparatus, said keyboard comprising:

a housing;

a user input device mounted in the housing, the user input device comprising a plurality of user-operable keys;

a processor for generating a corresponding key signal responsive to key-in of one of the keys;

a radiation-based signal transmitter for converting the corresponding key signal into a radiation beam and emitting the radiation beam, the radiation beam having a covered zone;

a user-adjustable engaging device having a first end engaging with the housing and a second end where the radiation-based signal transmitter is fixed; and wherein when the keyboard operates with the radiation-based signal receiver, the radiation-based signal transmitter is lifted higher than the top side of the portable computing apparatus by adjusting the engaging device such that the radiation-based signal receiver is located in the covered zone of the radiation beam.

6. The keyboard of claim 5, wherein the housing has an accommodating room, the engaging device accompanying with the radiation-based signal transmitter are capable of being accommodated into the accommodating room.

7. The keyboard of claim 6, wherein the radiation-based signal transmitter is electrically connected to the processor through the engaging device.

8. The keyboard of claim 7, further comprising a battery for supplying power for operation of the processor and the radiation-based signal transmitter.

9. The keyboard of claim 8, wherein the radiation beam is an infrared beam, the radiation-based signal transmitter is an infrared transmitter, and the radiation-based signal receiver is an infrared receiver.

10. A keyboard capable of operating with a radiation-based signal receiver of a portable computing apparatus, said keyboard comprising:

a housing comprising a top cover and a base, the top cover being pivotally engaged with the base;

a user input device mounted in the base, the user input device comprising a plurality of user-operable keys;

a processor for generating a corresponding key signal responsive to key-in of one of the keys;

a radiation-based signal transmitter for converting the corresponding key signal into a radiation beam and emitting the radiation beam, the radiation beam having a covered zone;

an engaging device having a first end engaging with the top cover and a second end where the radiation-based signal transmitter is fixed; and wherein when the keyboard operates with the radiation-based signal receiver, the radiation-based signal transmitter approaches the radiation-based signal receiver by making the top cover in an opened condition to expose the use the user-operable keys and by adjusting the engaging device such that the radiation-based signal receiver is located in the covered zone of the radiation beam.

11. The keyboard of claim 10, wherein the radiation-based signal transmitter is electrically connected to the processor through the engaging device and the top cover.

12. The keyboard of claim 11, wherein the housing also comprises a first door and a second door respectively engaging with the top cover, a supporting mechanism is formed by making the top cover, the first door and the second door in an assembly condition in order to support the portable computing apparatus.

13. The keyboard of claim 12, further comprising a battery for supplying power for operation of the processor and the radiation-based signal transmitter.

14. The keyboard of claim 13, wherein the radiation beam is an infrared beam, the radiation-based signal transmitter is an infrared transmitter, and the radiation-based signal receiver is an infrared receiver.

15. The keyboard of claim 14, wherein the engaging device is pivotally and rotatably engaged with the top cover via the first end.

16. The keyboard of claim 14, wherein the engaging device is telescopic.

17. A keyboard capable of operating with a radiation-based signal receiver of a portable computing apparatus, said keyboard comprising:

a housing comprising a top cover and a base, the top cover being pivotally engaged with the base and having an opening;

a user input device mounted in the base, the user input device comprising a plurality of user-operable keys;

a processor for generating a corresponding key signal responsive to key-in of one of the keys;

a radiation-based signal transmitter for converting the corresponding key signal into a radiation beam and emitting the radiation beam, the radiation beam having a covered zone;

an engaging device having a first end engaging with the top cover and a second end where the radiation-based signal transmitter is fixed, the engaging device being movably seated within the top cover and capable of moving out of the top cover; and wherein when the keyboard operates with the radiation-based signal receiver, and when the radiation-based transmitter is seated within the top cover, the radiation-based signal transmitter approaches the radiation-based signal receiver by making the top cover in an opened condition to expose the use the user-operable keys such that the radiation-based signal receiver is located in the covered zone of the radiation beam emitted through the opening.

18. The keyboard of claim 17, wherein when said keyboard operates with the radiation-based signal receiver, the radiation-based signal transmitter approaches the radiation-based signal receiver further more also by adjusting the engaging device other than by making the top cover in the opened condition such that the radiation-based signal receiver is located in the covered zone of the radiation beam.

19. The keyboard of claim 18, wherein the radiation-based signal transmitter is electrically connected to the processor through the engaging device and the top cover.

20. The keyboard of claim 19, wherein the housing also comprises a first door and a second door respectively engaging with the top cover, a supporting mechanism is formed by making the top cover, the first door and the second door in an assembly condition in order to support the portable computing apparatus.

21. The keyboard of claim 20, further comprising a battery for supplying power for operation of the processor and the radiation-based signal transmitter.

22. The keyboard of claim 21, wherein the radiation beam is an infrared beam, the radiation-based signal transmitter is an infrared transmitter, and the radiation-based signal receiver is an infrared receiver.

23. The keyboard of claim 22, wherein the engaging device is telescopic.

24. The keyboard of claim 23, wherein the engaging device is also rotatably engaged with the top cover via the first end.

* * * * *